No. 737,768. PATENTED SEPT. 1, 1903.
J. T. PRESTON.
CLOTH CUTTER.
APPLICATION FILED NOV. 3, 1902.
NO MODEL.
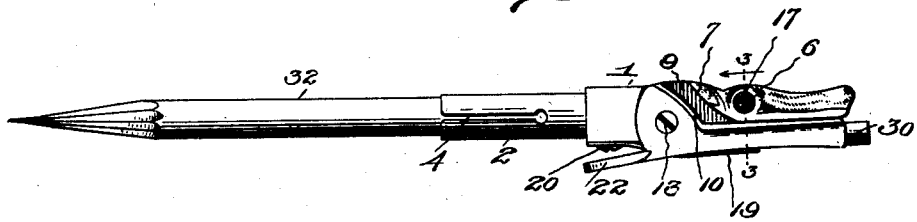
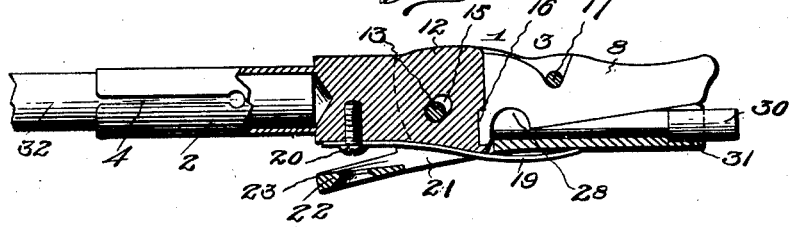
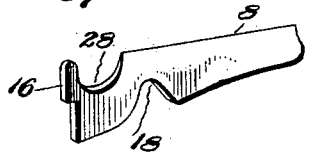 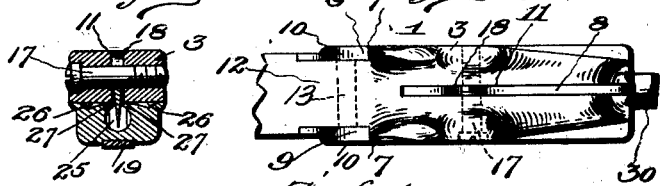 
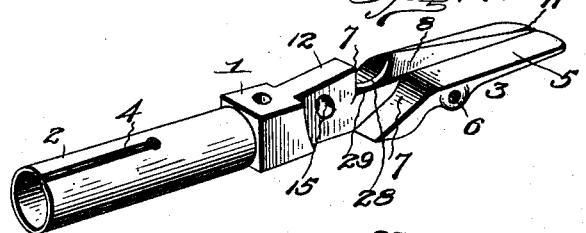
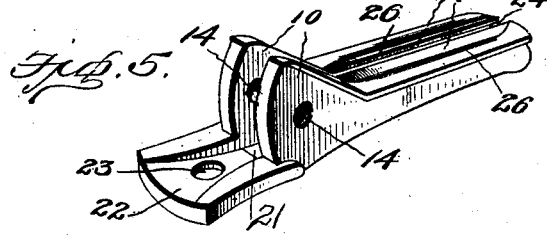
Witnesses:
C. T. Stewart
R. M. Elliott.
J. T. Preston, Inventor:
by C. A. Snow & Co.
Attorneys.
THE NORRIS PETERS CO., PHOTO-LITHO., WASHINGTON, D. C.

No. 737,768. Patented September 1, 1903.

UNITED STATES PATENT OFFICE.

JAMES T. PRESTON, OF FILLEY, MISSOURI.

CLOTH-CUTTER.

SPECIFICATION forming part of Letters Patent No. 737,768, dated September 1, 1903.

Application filed November 3, 1902. Serial No. 129,933. (No model.)

*To all whom it may concern:*

Be it known that I, JAMES T. PRESTON, a citizen of the United States, residing at Filley, in the county of Cedar and State of Missouri, have invented a new and useful Cloth-Cutter, of which the following is a specification.

This invention relates generally to cloth-cutting implements, and specifically to a novel form of cutting implement designed to supplant the ordinary scissors or shears used by employees in dry-goods stores for cutting fabrics.

One object of the invention is to present a device of the character specified which shall be neat and compact in form, which shall be thoroughly effective for cutting goods of any thickness, which will not be liable to become damaged or broken in use, and in which the cutting portion thereof may readily be sharpened when dull and replaced at a small cost when worn out.

A further object is to present a device for the uses stated which shall in addition to serving as a cutting implement constitute also a pencil and eraser holder, by which arrangement when a clerk has finished using the implement as a cutter he has in his hand his pencil for making out the sales-slip and also a rubber for correcting any error that might be made in his calculations.

With these and other objects in view, as will appear as the nature of the invention is better understood, the same consists in the novel construction and combination of parts of a cutting implement combining the adjunctive devices above named, as will be hereinafter fully described and claimed.

In the accompanying drawings, forming a part of the specification, and in which like numerals of reference indicate corresponding parts, there is illustrated one form of embodiment of the invention capable of carrying the same into effect, it being understood that the elements herein exhibited may be varied or changed as to shape, proportion, and exact manner of assemblage without departing from the scope of the invention.

In the drawings, Figure 1 is a view in side elevation, exhibiting the implement provided at one end with a pencil and at the other end with a rubber eraser. Fig. 2 is a view in side elevation, partly in section, showing more particularly the manner in which the knife is held assembled with the knife-carrier. Fig. 3 is a view in transverse section taken on the line 3 3, Fig. 1, and looking in the direction of the arrow thereon. Fig. 4 is a perspective detached detail view of the head or body of the cutter. Fig. 5 is a similar view of the sheath. Fig. 6 is a similar view of the knife. Fig. 7 is a detached detail view in plan of the head portion of the device viewed from the upper side thereof.

The device is herein shown in a reversed position to that occupied in use for clearness of illustration.

Referring to the drawings, 1 designates generally the head or body of the implement, the same comprising a tubular shank 2, constituting a pencil-holder, and a knife-carrier 3. The pencil-holder constitutes by preference an integral part of the head, although it may be a separate element associated therewith and may be split, as at 4, for a portion of its length to present spring-clamping arms or may be a plain tube. The knife-carrier 3 is constructed with a flat upper face 5, which extends some distance back of a pivot-opening 6, and thence inclines downward or outward and forms two shoulders 7, separated by the knife 8, the shoulders constituting the front walls of the two passage-ways 9, hereinafter designated "cloth-passages," through which the edges of the severed fabric pass, the rear wall of the passage-ways being formed by shoulders 10, carried by the sheath and pitched approximately at the same angle as the shoulders 7. The knife-carrier is provided with a longitudinally-disposed slot 11, which extends rearward from its outer end and terminates in one member 12 of a hinge-joint, the other member of which is formed by the shoulders 10 of the sheath, a screw or pin 13, passed through openings 14 in the said shoulders and through an opening 15 in the joint 12, serving to hold the parts assembled and to permit the sheath to have a rocking movement with relation to the knife-carrier. The rear end of the knife is provided with a shoulder 16, which projects into the portion of the slot 11 within the joint 12, as shown in Fig. 2, and thereby holds the blade against vertical or lateral displacement, a screw or pin 17, passed transversely through the opening 6 in the knife-carrier and engaging a recess 18 in the back of the knife, serving to hold the same against endwise displacement or removal.

It is essential to the proper operation of the device that the opposed faces of the sheath and of the knife-carrier shall in use always remain in parallelism in order that the fabric being severed will be prevented from wrinkling or gathering between the said faces, which would inevitably result if the space between these parts when separated by the included fabric were wedge-shaped. It is also essential that the parts automatically assume parallelism in operation, thus to adjust themselves to a fabric or cloth of any thickness without any manipulation of parts by the operator. To effect this, the opening 15 in the joint 12 is oblong and is disposed at an angle to the transverse diameter of the head and pitched toward the front end of the device, as clearly shown in Figs. 2 and 4. When the sheath is rocked on its pivot to open it to permit insertion of the material to be cut, the pivot 13 is in engagement with the lower wall of the opening 15, being normally held in this position by a spring 19, and when the sheath is released the spring 19 instantly closes it up against the knife, and as the face of the sheath contacts with the material the latter operates as a fulcrum to force the rear end of the sheath upward, projecting the pivot 13 toward or against the top of the opening 15, and thus bringing the opposed faces of the knife-carrier and the sheath into parallelism. Should the spring 19 fail to effect the exact adjustment of the parts as soon as end thrust is applied to the device to sever the fabric, this will bring about the proper disposition of the parts. The spring 19, which is an ordinary leaf-spring, is secured at one end by a screw 20 to the rear portion of the upper side of the head adjacent to the shank 2, the free end of the spring being passed through a slot 21, formed in the upper side of the sheath, and presses against the upper side thereof at a point approximately midway of its length, as shown in Fig. 2, so that, in effect, the bearing end of the spring constitutes a fulcrum upon which the sheath may have a limited rocking movement. The rear portion of the sheath is provided with a thumb-piece 22, by which it may be rocked on its pivot, the thumb-piece in this instance having an opening 23, disposed in line with the head of the screw 20, thereby to permit it to lie flat against the spring 19 when the sheath is open. It is to be understood, however, that the invention is not to be limited to this precise arrangement, as it will be evident that if the screw 20 have a tapered head, so that when seated it will lie flush with the spring 21, the provision of the opening 23 will be unnecessary.

The sheath is provided from its outer end back to the shoulders 10 with a slot 24, forming a continuation of a longitudinal channel 25, (clearly shown in Fig. 3,) also extending through the said end back to the shoulders, the upper surface of the slotted portion of the sheath being provided on each side of the slot with a recess or depression 26, which merge on a curve at each end into the slot 24. These recesses form two longitudinal ribs 27, disposed along the sides of the slot 24, and constitute cloth-stretchers which operate in an effective manner to prevent any wrinkling of the cloth adjacent to the knife 8, the cutting edge of which, as shown in Figs. 2 and 4, is disposed at an angle to the face of the knife-carrier, thereby presenting an angularly-disposed cutting edge which will operate to pinch the fabric or cloth up against the stretchers 27, and thereby effect easy severing or cutting thereof. The rear portion of the knife adjacent to its tang or heel is provided with a semicircular recess 28, in which rests the crotch of the goods being severed, whence it passes out through the cloth-passages 9, this portion of the blade being always housed within the channel 25 of the sheath, as clearly shown in Fig. 2. To facilitate the easy passage of the fabric from the recess 28 to the blade outward through the passages 9, these passages adjacent to the recess 28 are rounded at 29, as shown in Fig. 4, the rounded portions gradually merging into the straight portion of the joint 12, as also shown in the said figure.

In order to adapt the sheath for carrying a rubber eraser 30, the outer end of the channel 25 is enlarged, as shown at 31 in Fig. 2, and in this enlarged portion the eraser is inserted and is held by frictional contact with the walls thereof. The shank 2 is engaged by the pencil 32 in the manner usual to ordinary pencil-holders. It is to be understood that while the device is constructed to have associated therewith, as a matter of convenience, a pencil and a rubber eraser the invention is not to be limited to this combination, as either or both of the elements may be omitted without departing from the scope of the invention.

To operate the device, the piece of fabric to be cut is grasped between the thumb and the index-finger and the third and little finger of the left hand and is held taut. The thumb-piece 22 is then borne upon to rock the sheath on its pivot, and the fabric is then inserted between the opposed faces of the knife-carrier and the sheath, the knife resting on the bottom of the goods, after which the thumb-piece is released, whereupon the spring 19 will instantly close the sheath and press the stretchers 27 against the cloth, thereby holding the same under tension and at the same time bringing the opposed faces of the knife-carrier and the sheath into parallelism in the manner described. To effect cutting, the operator simply pushes the cutter across the fabric, and in doing this the fabric is brought into forceful contact with the edge of the knife and is thereby severed.

The utility of the pencil and rubber eraser will now be apparent. Ordinarily the clerk after having cut the goods will return the scissors used for the purpose to his pocket, and when the account-slip is to be made out he then has to search for his pencil, which is often misplaced and frequently lost, thereby causing a loss of time, and as the majority of pencils are not provided with a rubber eraser should a mistake be made in making up the sales-slip and the clerk is not provided with a rubber eraser the entry has to be canceled and made over again. With this device the user has combined in simple and compact form all the appliances required for use, and as it is of small size and simple construction it may be readily carried by a male clerk in his vest-pocket or by a female clerk in her belt or in her hair.

In constructing the device it may be cast or be made of stamped metal and may be suitably ornamented to present a neat and highly desirable article of manufacture.

Having thus fully described the invention, what I claim as new, and desire to secure by Letters Patent, is—

1. A device of the class described, comprising a fixed knife, and a movable sheath coacting therewith and provided with terminal shoulders.

2. A device of the class described, comprising a knife, and a sheath adapted for rocking movement to permit insertion of the fabric and for lateral movement to keep the opposed faces of the parts in parallelism.

3. A device of the class described, comprising a knife, and a sheath adapted for rocking movement to permit insertion of the fabric and for automatic lateral movement to keep the opposed faces of the parts in parallelism.

4. A device of the class described, comprising a knife, and a sheath coacting therewith and having a combined rocking and lateral movement with relation thereto.

5. A device of the class described, comprising a knife, and a movable sheath coacting therewith, the cutting edge of the knife being normally housed within the sheath and disposed at an angle to the operative face thereof.

6. A device of the class described, comprising a knife, a movable sheath coacting therewith and normally housing the knife and means operating automatically to cause contact between the opposed faces of the knife-carrying means and the sheath.

7. A device of the class described comprising pivotally-connected members having opposed parallel faces, one of which is provided with beveled fabric-stretching ribs and an intermediate slot, and a knife carried by the other member for operation in said slot.

8. A device of the class described, comprising a knife, a movable sheath coacting therewith, and cloth-passages arranged at the rear of the knife.

9. A device of the class described, comprising a knife, a movable sheath coacting therewith, said knife being provided near its tang with a recess, and cloth-passages formed by parts of the knife-carrying means and the sheath and coacting with the said recess to spread the severed edges of the fabric being operated on.

10. A device of the class described, comprising a knife, a sheath coacting therewith and having a combined rocking and lateral movement with relation thereto, and a spring secured to the knife-carrying portion of the device and bearing against the sheath and constituting a fulcrum.

11. A device of the class described, comprising a knife-carrier and a sheath pivotally associated therewith, the knife being disposed at an angle to the operative face of the sheath, and the opposed faces of the sheath and the carrier being arranged in parallelism in operation.

In testimony that I claim the foregoing as my own I have hereto affixed my signature in the presence of two witnesses.

JAMES T. PRESTON.

Witnesses:
 JOHN H. YOUNG,
 JAMES GROVES.